(12) United States Patent　　(10) Patent No.:　US 12,589,696 B2
　　Moore　　　　　　　　　　　　(45) Date of Patent:　　Mar. 31, 2026

(54) APPARATUS, SYSTEM, AND METHOD FOR VEHICLE CENTER CONSOLE LID STORAGE

(71) Applicant: Toyota Motor Engineering & Manufacturing North America, Inc., Plano, TX (US)

(72) Inventor: Jaime N. Moore, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 367 days.

(21) Appl. No.: 18/224,900

(22) Filed: Jul. 21, 2023

(65) Prior Publication Data

US 2025/0026274 A1　　Jan. 23, 2025

(51) Int. Cl.
　　B60R 7/04　　　　(2006.01)
　　B60R 7/08　　　　(2006.01)
　　B60R 11/00　　　　(2006.01)
(52) U.S. Cl.
　　CPC ................. B60R 7/04 (2013.01); B60R 7/08 (2013.01); *B60R 2011/0007* (2013.01)
(58) Field of Classification Search
　　CPC ......... B60R 7/04; B60R 7/06; B60R 13/0206; B60R 2011/0007
　　See application file for complete search history.

(56) References Cited

U.S. PATENT DOCUMENTS

| | | | |
|---|---|---|---|
| 5,316,368 A | 5/1994 | Arbisi | |
| 6,000,572 A * | 12/1999 | Kako | B25H 3/023 |
| | | | 220/522 |
| 6,619,738 B1 | 9/2003 | Filipovich | |
| 6,851,736 B1 | 2/2005 | Klopp, III et al. | |
| 6,866,319 B2 * | 3/2005 | Hupfer | E05B 83/30 |
| | | | 224/544 |
| 7,073,836 B2 | 7/2006 | Haspel | |
| 7,147,259 B2 | 12/2006 | Radu et al. | |
| 7,954,663 B2 | 6/2011 | DePue | |
| 9,156,407 B1 | 10/2015 | Kramer et al. | |
| 9,630,563 B2 | 4/2017 | Yang et al. | |
| 9,783,124 B2 | 10/2017 | Catlin et al. | |
| 9,845,055 B2 * | 12/2017 | Buza | B60R 7/04 |
| 10,183,626 B2 | 1/2019 | Thomas | |
| 10,906,490 B2 | 2/2021 | Martinez | |

(Continued)

FOREIGN PATENT DOCUMENTS

| | | | |
|---|---|---|---|
| CN | 206900267 U | 1/2018 | |
| DE | 19533374 C2 * | 7/1997 | B60R 11/0241 |

(Continued)

*Primary Examiner* — Robert E Fuller
(74) *Attorney, Agent, or Firm* — Snell & Wilmer LLP

(57)　　　　ABSTRACT

Apparatuses, systems, and methods for a vehicle include a compartment having an edge surrounding a cavity, a lid pivotally coupled to the compartment, the lid including an inner surface sized to span over the cavity and enclose the compartment, and a retainer sized and configured to removably couple to the inner surface. A plurality of attachment features can be used to selectively couple the retainer to the interior surface of the lid for retaining one or more items at the underside of the lid.

18 Claims, 10 Drawing Sheets

(56)                  References Cited

U.S. PATENT DOCUMENTS

| | | | | |
|---|---|---|---|---|
| 2013/0057011 | A1* | 3/2013 | Yamagishi | B60R 7/04 |
| | | | | 296/37.8 |
| 2017/0057416 | A1* | 3/2017 | Yang | B60R 7/04 |
| 2018/0118120 | A1* | 5/2018 | Ferreira Orta | B60R 7/04 |
| 2022/0203900 | A1* | 6/2022 | Nishio | E05F 3/14 |
| 2025/0026275 | A1* | 1/2025 | Moore | B60R 7/04 |

FOREIGN PATENT DOCUMENTS

| | | | | | |
|---|---|---|---|---|---|
| DE | 10032657 | A1 | | 1/2002 | |
| DE | 10032658 | A1 * | | 4/2002 | B60K 35/60 |
| ES | 2950763 | A1 * | | 10/2023 | B60N 2/793 |
| FR | 3107230 | A1 * | | 8/2021 | B60R 7/04 |
| JP | 2009083817 | A | | 4/2009 | |
| JP | 2024055684 | A | * | 4/2024 | B60N 3/08 |
| KR | 20210051187 | A | * | 5/2021 | B60R 13/0243 |
| WO | WO-2019028297 | A1 * | | 2/2019 | B60R 7/04 |

* cited by examiner

<u>700</u>

OPEN A CENTER CONSOLE LID TO EXPOSE AN OPENING IN A RETAINER REMOVABLY COUPLED TO THE CENTER CONSOLE LID — 702

CLOSE THE CENTER CONSOLE LID — 704

BLOCK THE OPENING IN THE RETAINER WITH AN INTERIOR SURFACE OF THE CENTER CONSOLE — 706

APPARATUS, SYSTEM, AND METHOD FOR VEHICLE CENTER CONSOLE LID STORAGE

BACKGROUND

Field

The present disclosure relates to apparatuses, systems, and methods for vehicle center console storage and, more particularly, to apparatuses, systems, and methods for organizing storage within a vehicle center console.

Description of the Related Art

Storage space within modern vehicles is at a premium. One area within vehicles which has become more utilized is the center console, typically located between two front or rear bucket seats. The size of the center console varies based on the size of the vehicle's passenger compartment. Many center consoles are designed large enough to store a number of items. Existing center consoles typically define a single open space. The size and shape of the center console varies, and often turns into a "junk drawer." Looking at different vehicles over the years, there have been various types of features that have been used to try and organize and make sense of the center console space. The depth of the box tends to make it difficult to organize or make the space useful so that important items are organized and easy to find. Some designs result in the loss of use of remaining space within the console due to the geometry of the console (e.g., the width and/or depth). For example, in the case of a single open space, because multiple items tend to be stacked, it becomes difficult to reach the lowest items. As a result, multiple items are not conveniently stored within the single open space. Moreover, items placed within the open space have a tendency to move around and get jostled during operation of the vehicle.

Accordingly, there is a need for a system and a method for providing organization and ease of access to a vehicle center console.

SUMMARY

Described herein is an apparatus for a vehicle. The apparatus includes a compartment having an edge surrounding a cavity, a lid pivotally coupled to the compartment, the lid including an inner surface sized to span over the cavity and enclose the compartment, and a retainer sized and configured to removably couple to the inner surface.

In various embodiments, the retainer can be configured to be suspended from the lid when the lid is in a closed position. The retainer can at least partially define an opening for receiving one or more items to be stored in the compartment when the lid is in the closed position. An interior surface of the compartment can be disposed at the opening of the retainer in response to the lid moving to the closed position, whereby the one or more items are blocked from exiting the retainer. The inner surface can include a plurality of lid apertures. The retainer can include a plurality of attachment features. Each lid aperture of the plurality of lid apertures can be configured to receive an attachment feature of the plurality of attachment features for securing the retainer to the lid. Each attachment feature of the plurality of attachment features can include a clamping member configured to clamp to the lid. The apparatus can further include a plurality of rubber button fasteners configured to attach the retainer to the lid. Each rubber button fastener can include a first flange, a second flange, and a third flange. The inner surface of the lid is configured to be received between the first flange and the second flange, and an attachment portion of the retainer is configured to be received between the second flange and the third flange. The retainer can include an elastic strap configured to bias a portion of the retainer toward the lid. The apparatus can further include a plurality of lid apertures disposed in the inner surface of the lid, and the retainer includes an attachment feature configured to be received by each of the plurality of lid apertures, whereby the retainer is configurable between a plurality of positions with respect to the lid. In response to the lid moving to a closed position, the retainer can be inclined at an angle with respect to a horizontal plane. The retainer can include a first side portion extending from the lid, a central portion extending from the first side portion, and a second side portion at least partially defining an opening whereby the retainer is configured to receive one or more items for storage, the second side portion extending toward the lid. The inner surface can include a first side surface and a second side surface defining a recess in the inner surface, the retainer configured to removably couple to the first side surface and the second side surface. The retainer and the inner surface define an opening whereby one or more items can be received therebetween. The retainer can further include a retainer lid disposed at the opening.

Also described is a vehicle center console. The vehicle center console includes a compartment having an edge surrounding a cavity, a lid pivotally coupled to the compartment, and a retainer. The lid includes an inner surface sized to span over the cavity and enclose the compartment. A plurality of lid apertures are disposed in the inner surface of the lid. The retainer is sized and configured to removably couple to the inner surface via the plurality of lid apertures.

In various embodiments, the vehicle center console further includes a rubber button fastener configured to couple to the lid via a first lid aperture of the plurality of lid apertures, whereby the retainer is configured to removably couple to the inner surface. The retainer can include a plurality of retainer apertures. The rubber button fastener is configured to couple to the retainer via a first retainer aperture of the plurality of retainer apertures. The retainer can include a first attachment feature configured to be received by a first lid aperture of the plurality of lid apertures, whereby the retainer is configured to removably couple to the inner surface. The first attachment feature can include a clamping member configured to clamp to the lid at the first lid aperture. The first attachment feature can further be configured to be received by a second lid aperture of the plurality of lid apertures. The first attachment feature is moveable between the first lid aperture and the second lid aperture to adjust a position of the retainer.

Moreover, also described is a method for accommodating one or more items in a vehicle center console. The method includes opening a center console lid to expose an opening in a retainer removably coupled to the center console lid, the retainer defining a receptacle for receiving one or more items, closing the center console lid, and blocking the opening in the retainer with an interior surface of the center console to contain the one or more items within the retainer. In various embodiments, the method further comprises securing the retainer to the center console lid with a rubber button fastener.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views, wherein:

DETAILED DESCRIPTION

The present disclosure describes apparatuses, systems, and methods for center console storage for a vehicle. For instance, a modular center console retainer can hold items of importance to a user. Different retainers may be developed and specifically sized to hold various items, such as DVDs, CDs, wallets, a small purse, snacks, smart phones, toiletries, medicine, etc. Apparatuses, systems, and methods optimize the space within a center console by creating a readily accessible container/retainer at the underside of the console lid. Apparatuses, systems, and methods can hold items sufficiently in place in the respective retainer(s) during reasonable driving conditions (e.g., vehicle acceleration and/or deceleration) so as to meet user expectations. Apparatuses, systems, and methods can allow for the retainer(s) to be removed and replaced by the user a reasonable number of times. Apparatuses, systems, and methods can meet environmental test requirements under load without breaking or warping significantly so as to meet user expectations.

Apparatuses, systems, and methods include a storage module (referred to herein as a retainer) for securing one or more items within the retainer and attaching to a center console lid. The retainer can be removably coupled to the center console lid using a plurality of attachment features (e.g., a clamping member and/or a rubber button fastener). The center console lid can be configured with a plurality of lid apertures (e.g., a "bulletin board" style of holes, hooks, or buttons) whereby one or more retainers are configurable between a plurality of positions as desired. In this manner, a user can install the retainer in a position relative to the lid as desired. Moreover, a user can install multiple retainers of various types, shapes, sizes, etc. as desired to secure various items to the lid.

Figure 1A:
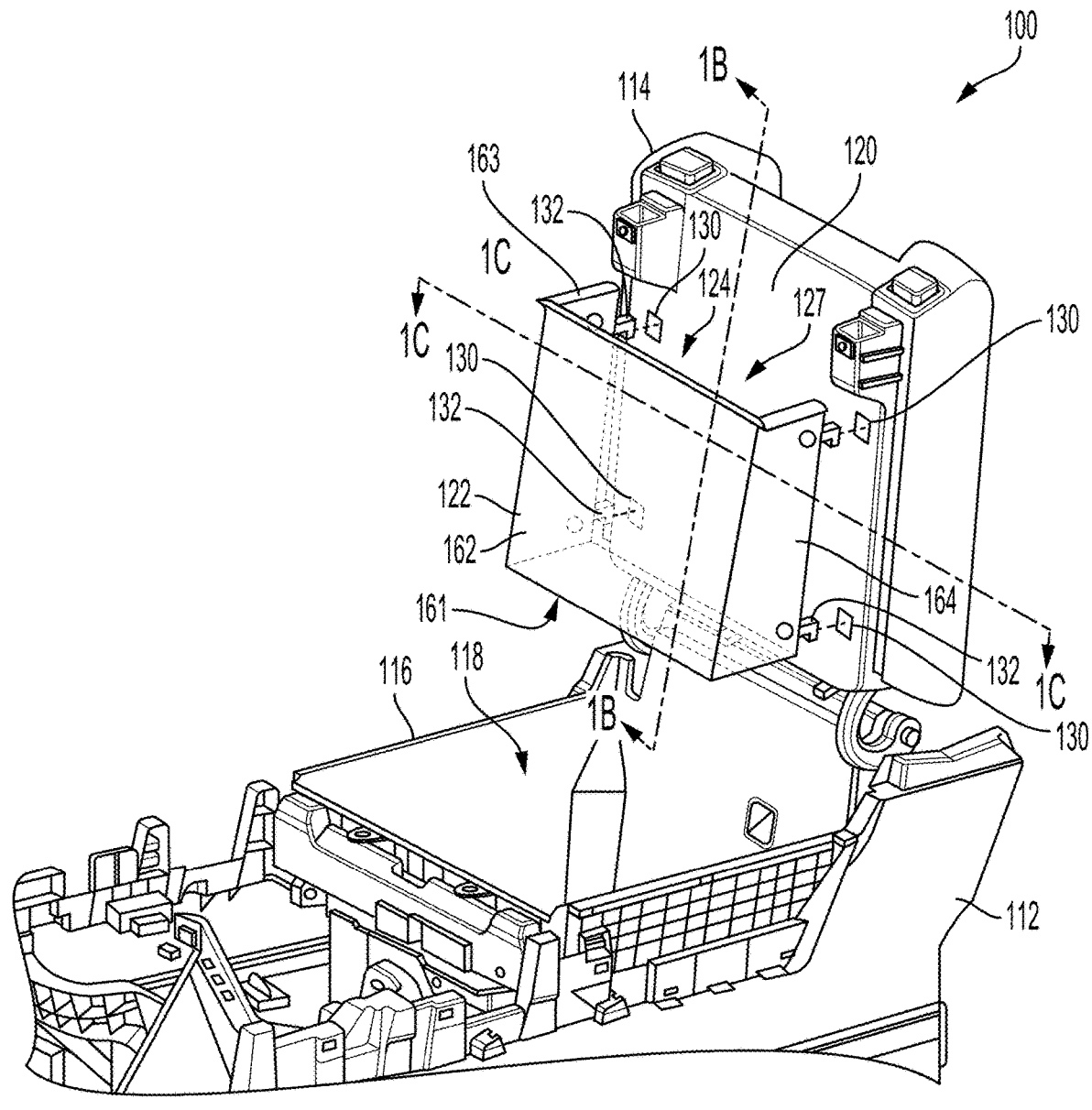
FIG. 1A is a schematic fragmentary, assembly view of a vehicle center console with a removable retainer according to an embodiment of the present disclosure.

Referring to the drawings, wherein like reference numbers correspond to like or similar components throughout the several figures. FIG. 1A generally shows an apparatus for a vehicle comprising a center console 100 that includes a compartment 112 and a lid 114 pivotally coupled to the compartment 112. The compartment 112 has an edge 116 surrounding a cavity 118. The lid 114 includes an inner surface 120 sized to span over the cavity 118 and enclose the compartment 112. A retainer 122 is sized and configured to removably couple to the inner surface 120 of the lid 114. In this manner, when coupled to the inner surface 120, the retainer 122 can pivot together with the lid 114 with respect to the compartment 112. The retainer 122 can be configured as a hanging storage module.

Figure 1B:
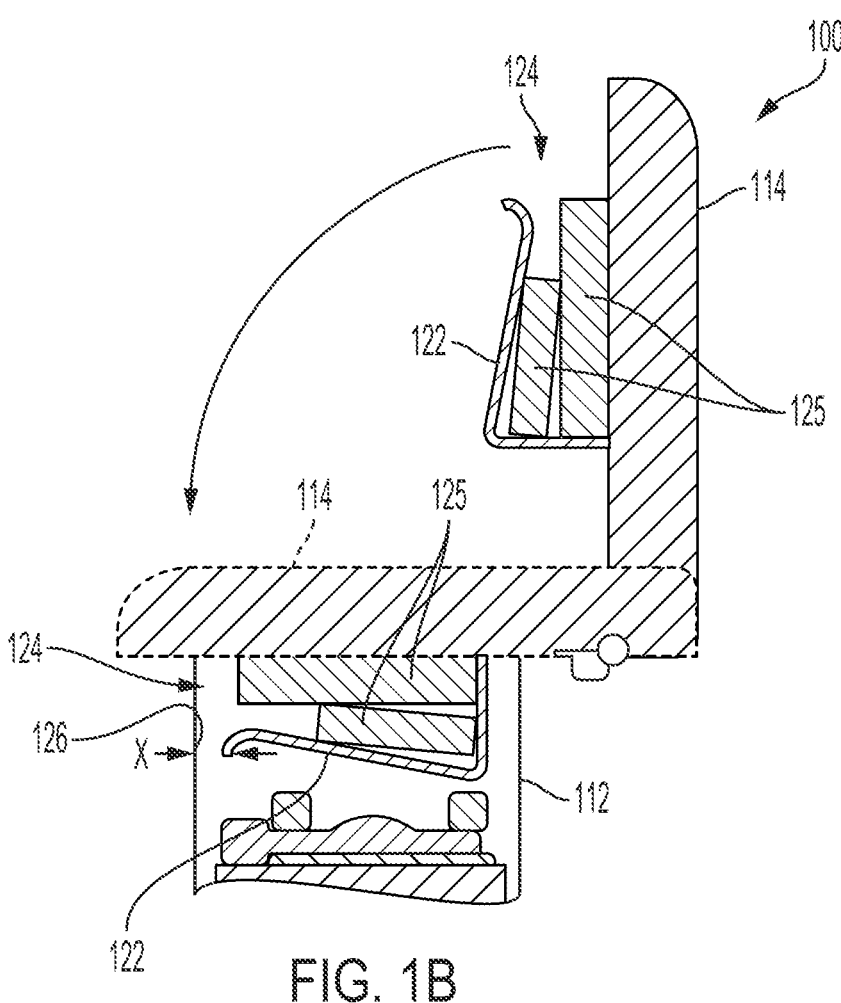
FIG. 1B is a section view taken along line 1B-1B of the vehicle center console and removable retainer of FIG. 1A with the lid in open and closed positions according to an embodiment of the present disclosure.
Figure 1C:
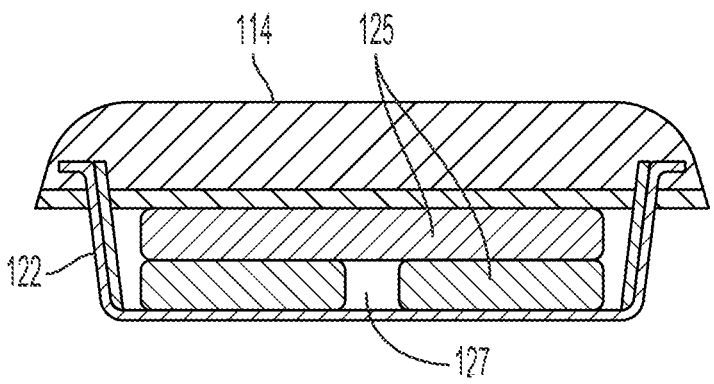
FIG. 1C is a section view of line 1C-1C of the vehicle center console and removable retainer of FIG. 1A according to an embodiment of the present disclosure.

With combined reference to FIG. 1A, FIG. 1B, and FIG. 1C, the retainer 122 can be configured to be suspended from the lid 114 when the lid 114 is in a closed position (see FIG. 1B). The retainer 122 at least partially defines an opening 124 for receiving one or more items 125 into a space 127 between the lid 114 and the retainer 122 to be stored in the compartment 112 when the lid 114 is in the closed position. Stated differently, the retainer 122 at least partially defines an opening 124 for receiving one or more items into a receptacle at least partially defined by the retainer 122.

An interior surface 126 of the compartment 112 can be disposed at the opening 124 of the retainer 122 in response to the lid 114 moving to the closed position, whereby the one or more items 125 are blocked from exiting the retainer 122. In response to the lid 114 moving to an open position, the retainer 122 and any items 125 located therein can move together with the lid 114 and at least partially exit the cavity 118 for ready and easy access by a user.

The retainer 122 can be a rigid structure made from a plastic material, a composite material, a fiber-reinforced material, and/or a metal material, among others, as desired. The retainer 122 can be configured to flex relative to the lid 114 for accommodating more or less items 125, as desired.

In some embodiments, the retainer 122 can include one or more flexible members, such as a textile strap, a rope, a cord, or the like.

The retainer 122 can include a first wall 161 (also referred to herein as a first side portion) extending from the inner surface 120 and at least partially defining a back surface of the opening 124. The first wall 161 can include a substantially rectangular geometry in various embodiments. The retainer 122 can further include a second wall 162 (also referred to herein as a central portion) extending from the first wall 161 toward the opening 124. The second wall 162 can extend from the first wall 161 to the opening 124. The second wall 162 can include a substantially rectangular geometry in various embodiments. The second wall 162 can be oriented substantially perpendicular to the first wall 161 in various embodiments. The second wall 162 can be oriented substantially parallel to the inner surface 120 in various embodiments. The retainer 122 can further include a third wall 163 extending from the second wall 162 toward the inner surface 120. The third wall 163 can further extend from the first wall 161. The third wall 163 can extend from the first wall 161 to the opening 124. The third wall 163 can extend from the second wall 162 to the inner surface 120. The third wall 163 can include a substantially rectangular geometry in various embodiments. The third wall 163 can be oriented substantially perpendicular to the inner surface 120 and/or the second wall 162 in various embodiments. The retainer 122 can further include a fourth wall 164 extending from the second wall 162 toward the inner surface 120. The fourth wall 164 can further extend from the first wall 161. The fourth wall 164 can extend from the first wall 161 to the opening 124. The fourth wall 164 can extend from the second wall 162 to the inner surface 120. The fourth wall 164 can have a substantially rectangular geometry in various embodiments. The fourth wall 164 can be oriented substantially perpendicular to the inner surface 120 and/or the second wall 162 in various embodiments. The fourth wall 164 can be oriented substantially parallel to the third wall 163 in various embodiments.

In various embodiments, one or more attachment features (e.g., attachment feature 132 (see FIG. 2A and FIG. 2B) and/or attachment feature 240 (see FIG. 3A and FIG. 3B)) extend from the third wall 163 whereby the retainer 122 is coupled to the lid 114. Similarly, one or more attachment features (e.g., attachment feature 132 (see FIG. 2A and FIG. 2B) and/or attachment feature 240 (see FIG. 3A and FIG. 3B)) can extend from the fourth wall 164 whereby the retainer 122 is coupled to the lid 114. In this regard, the retainer 122 can include one or more attachment features (e.g., attachment feature 132) formed integrally therewith, in accordance with various embodiments. In various embodiments, the attachment features (e.g., attachment feature 240) are removably coupled to the retainer 122. In various embodiments, the inner surface 120 includes a plurality of apertures 130 (also referred to herein as lid apertures). Each aperture 130 can be sized, shaped and/or configured to receive an attachment feature for coupling the retainer 122 to the lid 114.

Figures 2A, 2B:
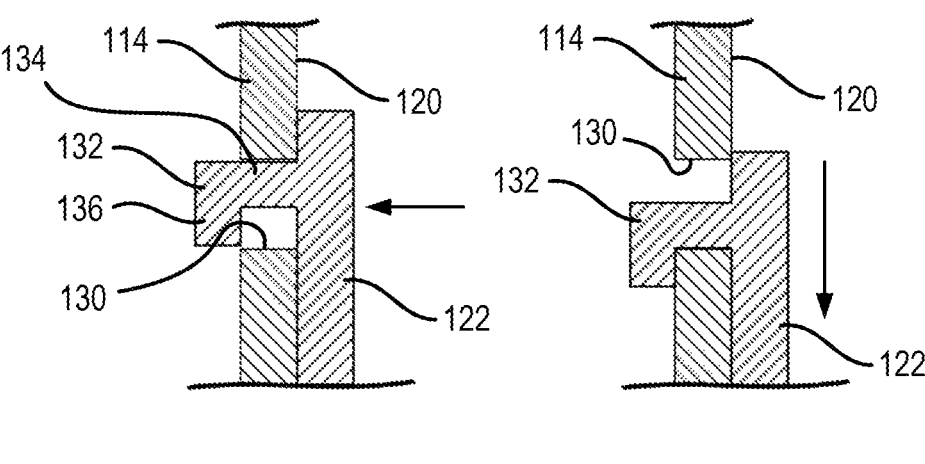
FIG. 2A and FIG. 2B are schematic, fragmentary views of a retainer being installed onto a lid with an integral attachment feature according to an embodiment of the present disclosure.

With reference to FIG. 2A and FIG. 2B, the retainer 122 can include one or more attachment features 132 (also referred to herein as a clamping member) formed integrally therewith. The attachment feature 132 can include a hook-like or a clamp-like feature including a first projection 134 extending from the retainer 122 and a second projection 136 extending from the first projection 134. The first projection 134 can extend through the lid aperture 130. The second projection 136 can extend at an angle with respect to the first projection 134. For example, the second projection 136 can extend at an angle of between 45 degrees and 135 degrees in various embodiments, at an angle of between 85 degrees and 95 degrees in various embodiments, and at an angle of between 89 degrees and 91 degrees in various embodiments, with respect to the first projection 134. The second projection 136 can extend orthogonally with respect to the first projection 134 in various embodiments. The lid 114 can be compressed between the second projection 136 and the retainer 122 when the retainer is installed on the lid 114. To install the retainer 122, the second projection 136 can be inserted through the lid aperture 130 and slid sideways such that a portion of the lid 114 is located between the second projection 136 and the retainer 122 and the first projection 134 extends through the lid aperture 130 (see FIG. 2B). In this manner, the attachment feature 132 can clamp to the lid 114 at the inner surface 120.

Figures 3A, 3B:
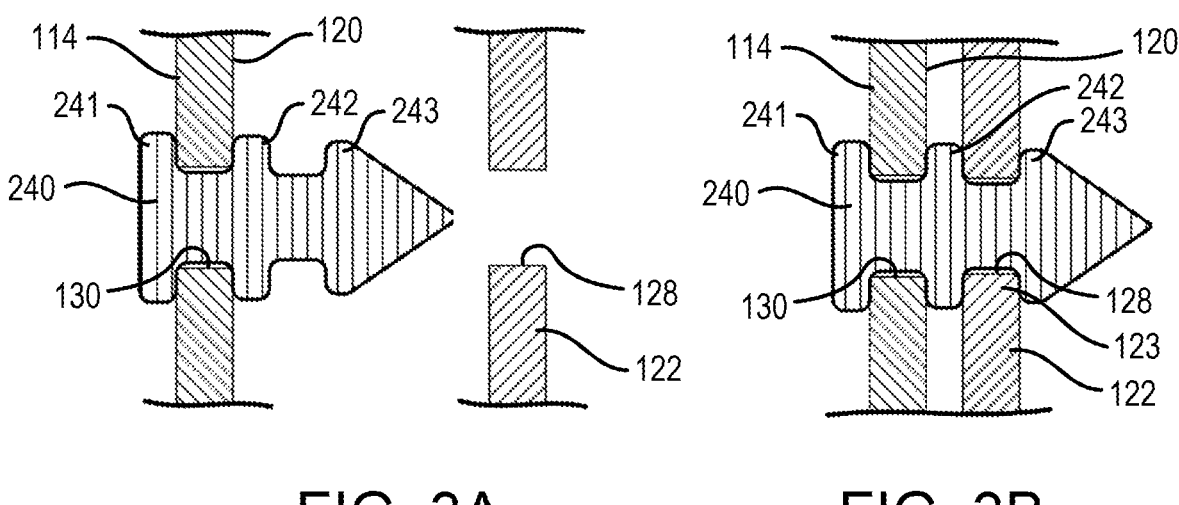
FIG. 3A and FIG. 3B are schematic, fragmentary views of a retainer being installed onto a lid with a removable attachment feature according to an embodiment of the present disclosure.

With reference to FIG. 3A and FIG. 3B, the attachment feature can be a separate member from the retainer 122. In various embodiments, the retainer 122 is coupled to the lid 114 via one or more attachment features 240. The attachment feature 240 can be a rubber button fastener in various embodiments. The attachment feature 240 can have a generally cylindrical body with a plurality of flanges extending therefrom, as described in further detail herein. The attachment feature 240 can be made of a rubber material and can include a first portion configured to momentarily deform (e.g., due to its soft, elastic rubber material) to be placed in the lid aperture 130 and a second portion configured to momentary deform to be placed in an aperture 128 disposed in the retainer 122. For example, the attachment feature 240 can include a first flange 241 at a first end thereof and a second flange 242 at a middle portion thereof. The first flange 241 can deform to fit through the lid aperture 130 and then return to its original (or near original) shape to secure the lid 114 between the first flange 241 and the second flange 242. In this regard, a distance between the first flange 241 and the second flange 242 can correspond to a thickness of the lid 114. The distance between the first flange 241 and the second flange 242 can be equal to the thickness of the lid 114 when the attachment feature 240 is installed on the lid 114. For example, the first flange 241 and the second flange 242 can apply a compressing force on the lid 114 when in the installed position to secure the attachment feature 240 in place. The second flange 242 can rest against the inner surface 120. In various embodiments, the attachment feature 240 can be pre-installed on the lid 114 such that the retainer 122 need only be placed over the attachment feature 240 by a user to install the retainer 122 to the lid 114.

The attachment feature 240 can further include a third flange 243 at a second end thereof, opposite the first end. In this manner, the second flange 242 can be located between the first flange 241 and the third flange 243. The retainer 122 can be installed over the attachment feature 240 by moving the third flange 243 through the aperture 128 such that an attachment portion 123 of the retainer 122 is located between the second flange 242 and the third flange 243. Similar to the first flange 241 and the second flange 242 in relation to the lid 114, the third flange 243 can deform to fit through the aperture 128 and then return to its original (or near original) shape to secure the retainer 122 between the third flange 243 and the second flange 242. In this regard, a distance between the third flange 243 and the second flange 242 can correspond to a thickness of the attachment portion 123 of the retainer 122. The distance between the third flange 243 and the second flange 242 can be equal to the thickness of the attachment portion 123 of the retainer 122 when the attachment feature 240 is installed on the retainer 122. For example, the third flange 243 and the second flange 242 can apply a compressing force on the attachment feature 123 of the retainer 122 when in the installed position to secure the retainer 122 in place with respect to the lid 114. The second flange 242 can rest against the retainer 122. The third flange 243 can rest against the retainer 122. In various embodiments, the attachment feature 240 can be pre-installed on the retainer 122 such that the attachment feature 240 need only be placed into the lid aperture 130 to install the retainer 122 to the lid 114. In various embodiments, the third flange 243 can be tapered to assist with moving the retainer 122 over the third flange 243 to the installed position. Although illustrated in FIG. 3A and FIG. 3B as being installed first on the lid 114 and then the retainer 122 being installed over the attachment feature 240, the lid 114 and the retainer 122 can be swapped (i.e., the attachment feature 240 can be installed first on the retainer 122 and then the attachment feature 240 attached to the lid 114) without departing from the scope of the present disclosure.

Figure 4A:
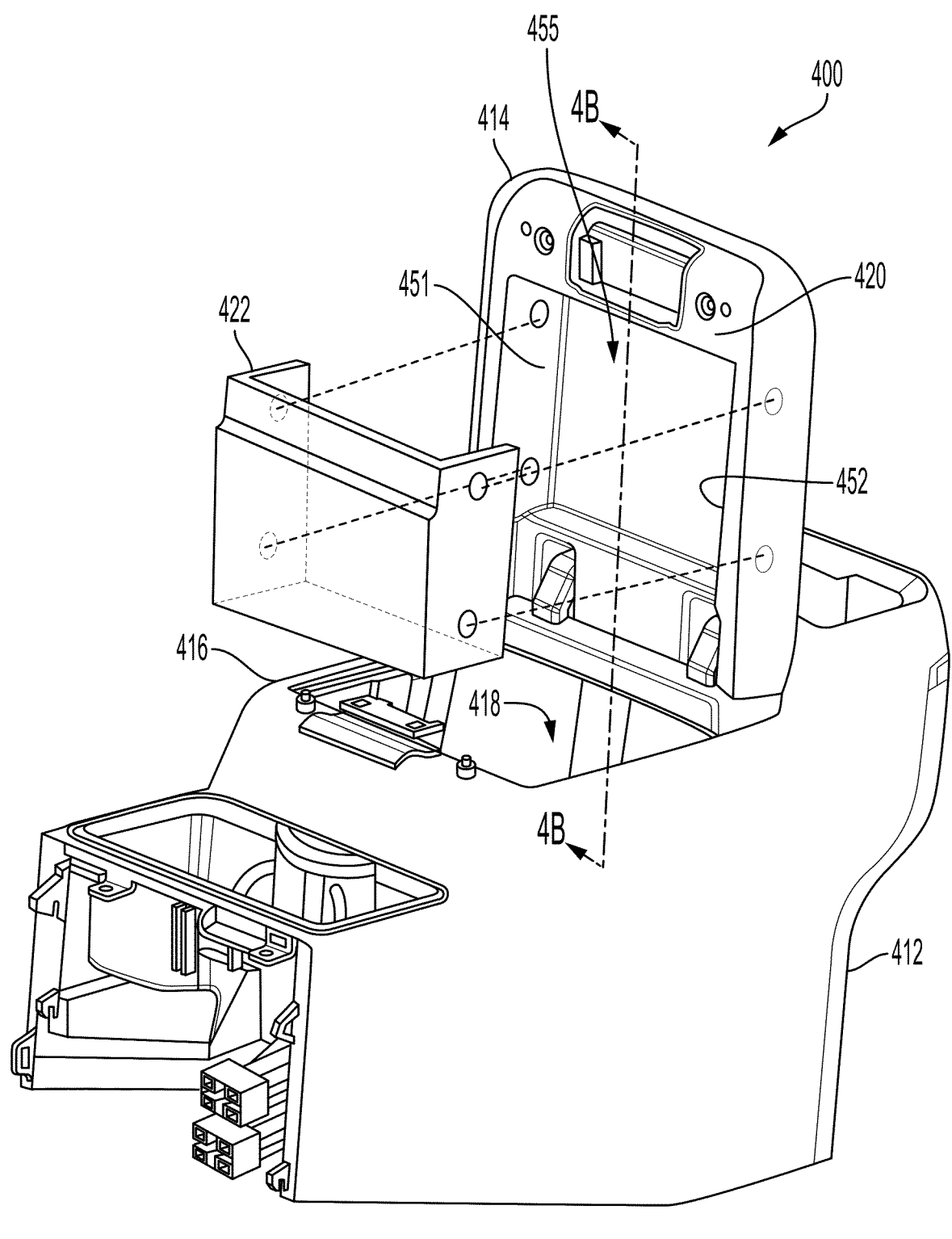
FIG. 4A is a schematic assembly view of a vehicle center console with a removable retainer according to an embodiment of the present disclosure.
Figure 4B:
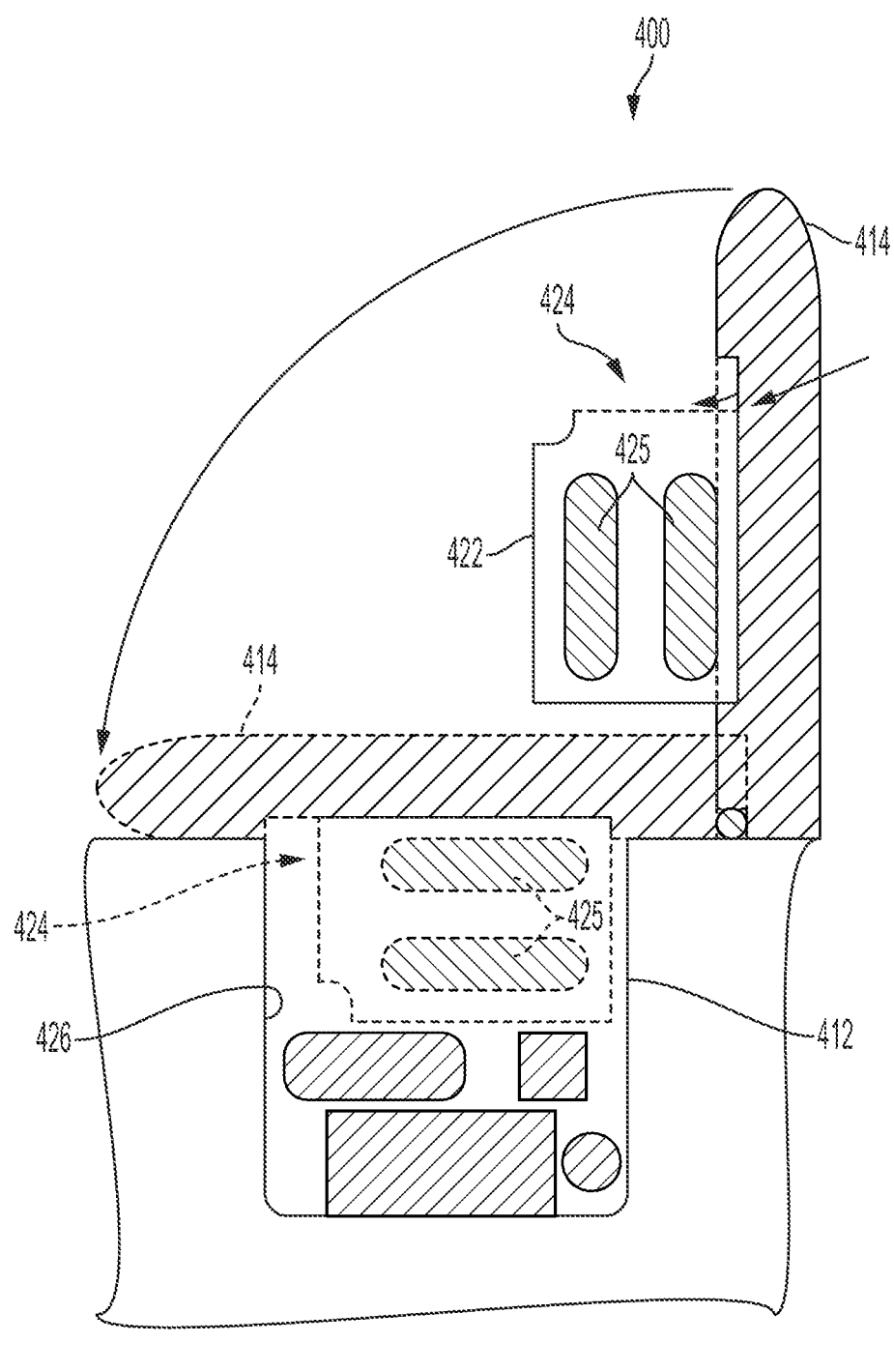
FIG. 4B is a section view taken along line 4B-4B of the vehicle center console and removable retainer of FIG. 4A with the lid in open and closed positions according to an embodiment of the present disclosure.

With reference to FIG. 4A and FIG. 4B, an apparatus for a vehicle having a center console 400 that includes a compartment 412 and a lid 414 pivotally coupled to the compartment 412 is illustrated, in accordance with various embodiments. The compartment 412 has an edge 416 surrounding a cavity 418. The lid 414 includes an inner surface 420 sized to span over the cavity 418 and enclose the compartment 412. A retainer 422 is sized and configured to removably couple to the inner surface 420 of the lid 414. In this manner, when coupled to the inner surface 420, the retainer 422 can pivot together with the lid 414 with respect to the compartment 412. In various embodiments, the inner surface 420 has a first side surface 451 and a second side surface 452 defining a recess 455 in the inner surface 420. The retainer 422 can be removably coupled to the first side surface 451 and/or the second side surface 452. For example, the retainer 422 can have an attachment feature (i.e., attachment feature 132) similar to that described with respect to FIG. 2A and FIG. 2B. The retainer 422 can be removably coupled to the inner surface 420 via one or more attachment features (i.e., the attachment feature 240) as described with respect to FIG. 3A. The retainer 422 and the inner surface 420 can define an opening 424 whereby one or more items 425 can be received therebetween.

An interior surface 426 of the compartment 412 can be disposed at the opening 424 of the retainer 422 in response to the lid 414 moving to the closed position (see FIG. 4B), whereby the one or more items 425 are blocked from exiting the retainer 422 (e.g., in response to a vehicle decelerating abruptly).

Figure 8:
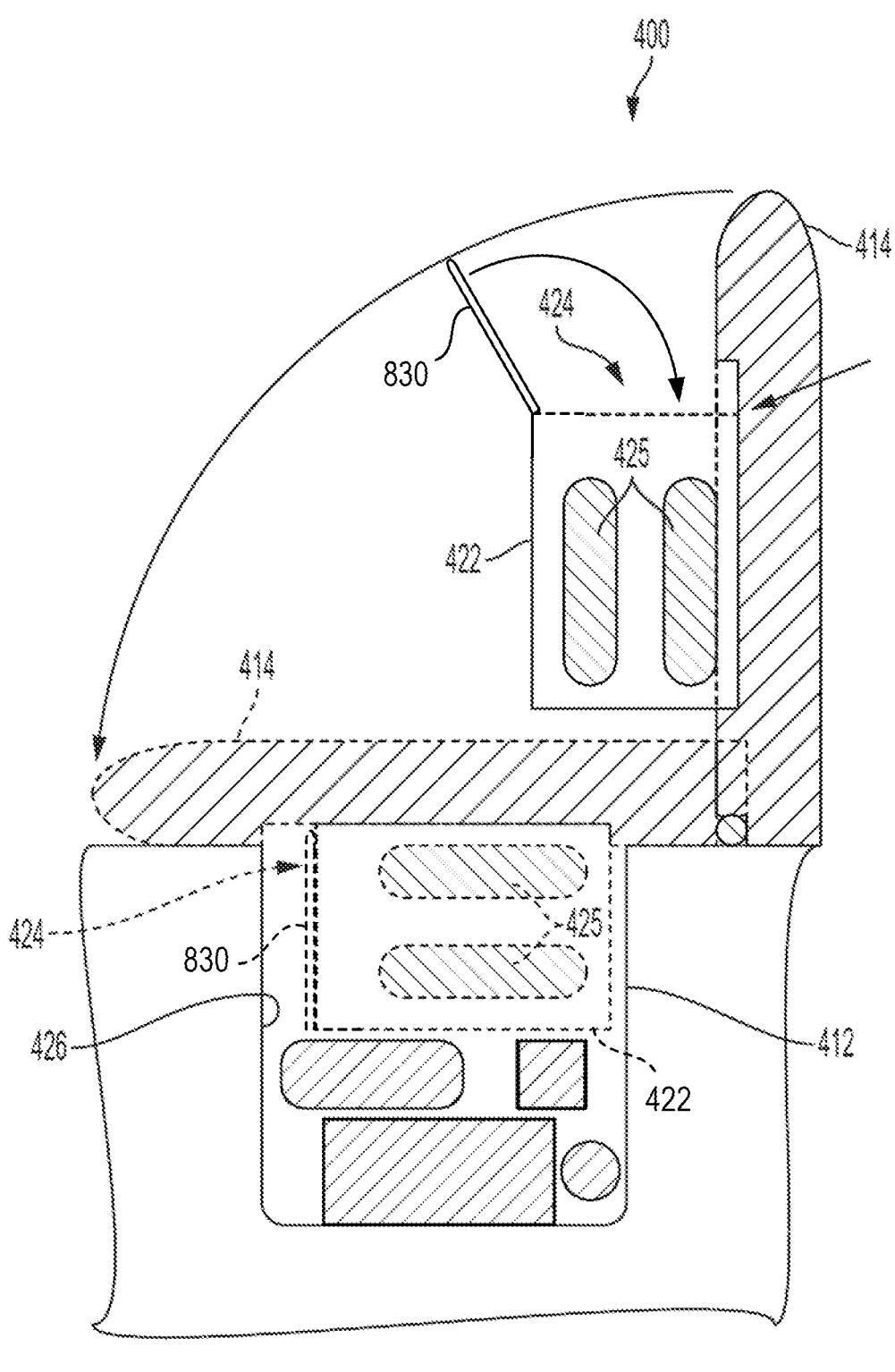
FIG. 8 is a section view taken along line 4B-4B of the vehicle center console and removable retainer of FIG. 4A with the lid in open and closed positions and the retainer including a retainer lid according to an embodiment of the present disclosure.

With respect to FIG. 8, elements with like element numbering, as depicted in FIG. 4B, are intended to be the same or similar and will not necessarily be repeated for the sake of clarity. With momentary reference to FIG. 8, the retainer 422 can further include a retainer lid 830 disposed at the opening 424 and configured to enclose the retainer 422, in accordance with various embodiments. The retainer lid 830 can be pivotally coupled to the body (e.g., at the second wall 162; see FIG. 1A) of the retainer 422. Accordingly, the retainer lid 830 can aide in securing the one or more items 425 within the retainer 422, whereby the one or more items 425 are blocked from exiting the retainer 422 (e.g., in response to a vehicle decelerating abruptly).

Figure 5:
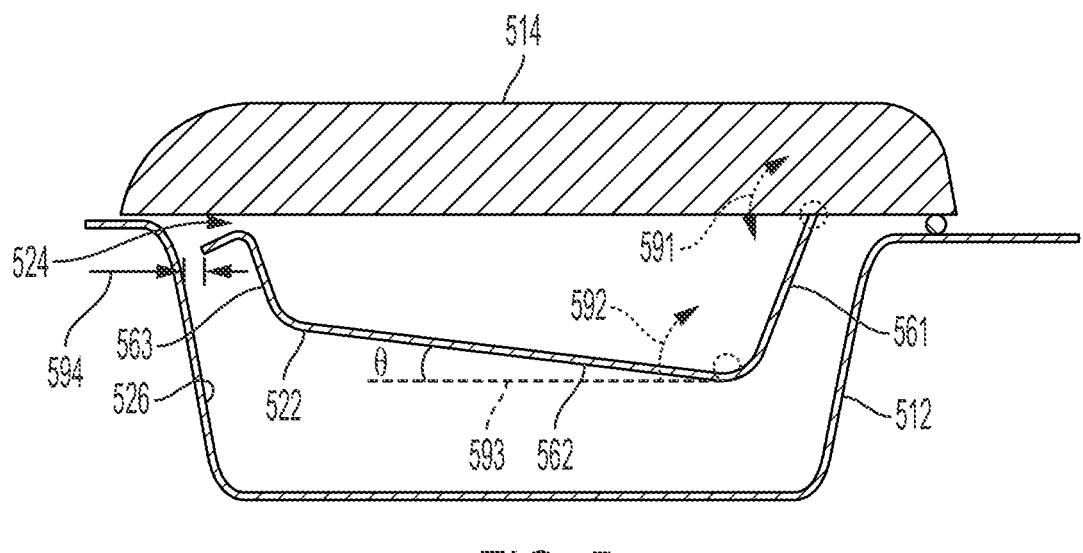
FIG. 5 is a schematic view of a retainer installed at the underside of a lid with the lid in a closed position according to an embodiment of the present disclosure.

With reference to FIG. 5, a lid 514 (e.g., a vehicle center console lid) with a retainer 522 mounted thereto are illustrated pivotally coupled to a compartment 512. The lid 514, the retainer 522, and the compartment 512 can be similar to any of the lids, retainers, or compartments, respectively, described herein. In various embodiments, the retainer 522 has a first side portion 561 extending from the lid, a central portion 562 extending from the first side portion 561, and a second side portion 563 at least partially defining an opening 524 whereby the retainer 522 is configured to receive one or more items for storage when the lid 514 is in the open position. The second side portion 563 can extend from the central portion 562 toward the lid 514.

In various embodiments, the first side portion 561 can be configured to rotate and/or flex with respect to the lid 514, as represented by arrows 591. In various embodiments, the central portion 562 can be configured to rotate and/or flex with respect to the lid 514 and/or the first side portion 561, as represented by arrows 592. In various embodiments, in response to the lid 514 moving to the closed position, as illustrated, the retainer 522 can be inclined at an angle θ with respect to a horizontal plane represented by dashed line 593. More particularly, the central portion 562 can be inclined at the angle θ. The closed position of the lid 514 prevents any items from falling out of the retainer 522. The lid 514 can also be locked or secured in the closed position. In various embodiments, the second side portion 563 can define a step in the retainer 522 to hold items from sliding and/or exiting the retainer 522. The retainer 522 can be configured to minimize a gap 594 between the retainer 522 and an interior surface 526 of the compartment 512. The retainer 522 can be made from a flexible plastic material and/or a textile fabric (e.g., a cargo netting).

Figure 9:
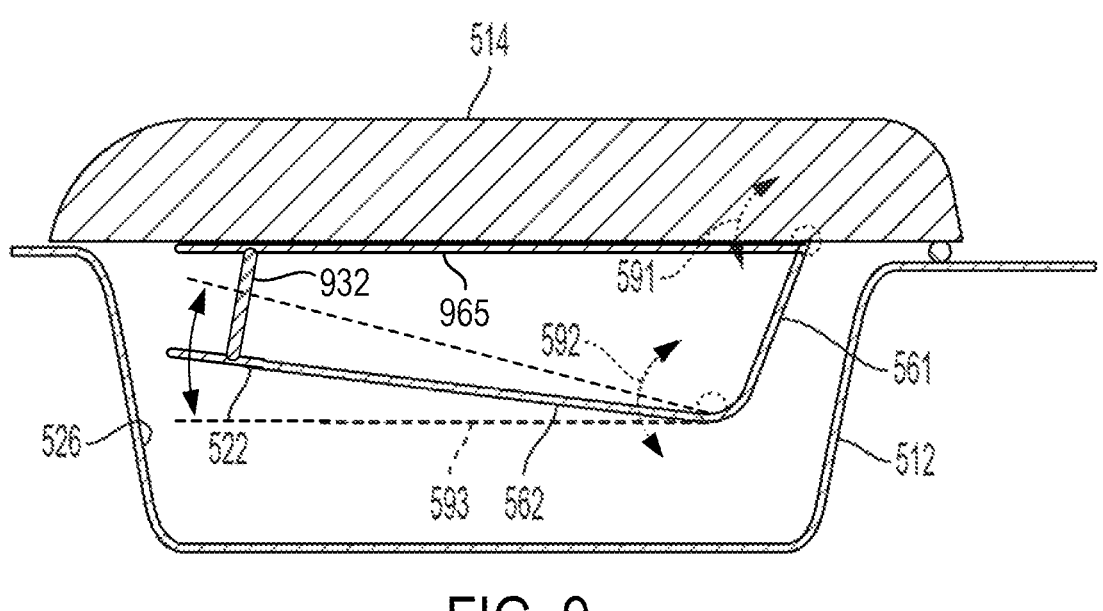
FIG. 9 is a schematic view of a retainer installed at the underside of a lid with the lid in a closed position and the retainer including an elastic strap for biasing the retainer toward the lid according to an embodiment of the present disclosure.

With respect to FIG. 9, elements with like element numbering, as depicted in FIG. 5, are intended to be the same or similar and will not necessarily be repeated for the sake of clarity. With momentary reference to FIG. 9, the retainer 522 can further include an elastic strap 932 configured to bias the central portion 562 toward the lid 514 to aide in securing the one or more items within the retainer 522, whereby the one or more items are prevented from exiting the retainer 522 (e.g., in response to a vehicle decelerating abruptly). The elastic strap 932 can be configured to stretch in response to the central portion 562 moving away from the lid 514 and can contract in response to the central portion 562 moving toward the lid 514. In various embodiments, the elastic strap 932 extends from the central portion 562 to the lid 514. In various embodiments, the elastic strap 932 extends from the central portion 562 to an opposing wall 965 of the retainer 522. Accordingly, the elastic strap 932 can aide in securing the one or more items within the retainer 422 by minimizing the size of the opening into the retainer 522 and/or compressing the one or more items between the central portion 562 and the opposing wall 965 and/or the lid 514, whereby the one or more items are prevented from exiting the retainer 422 (e.g., in response to a vehicle decelerating abruptly).

Figure 6:
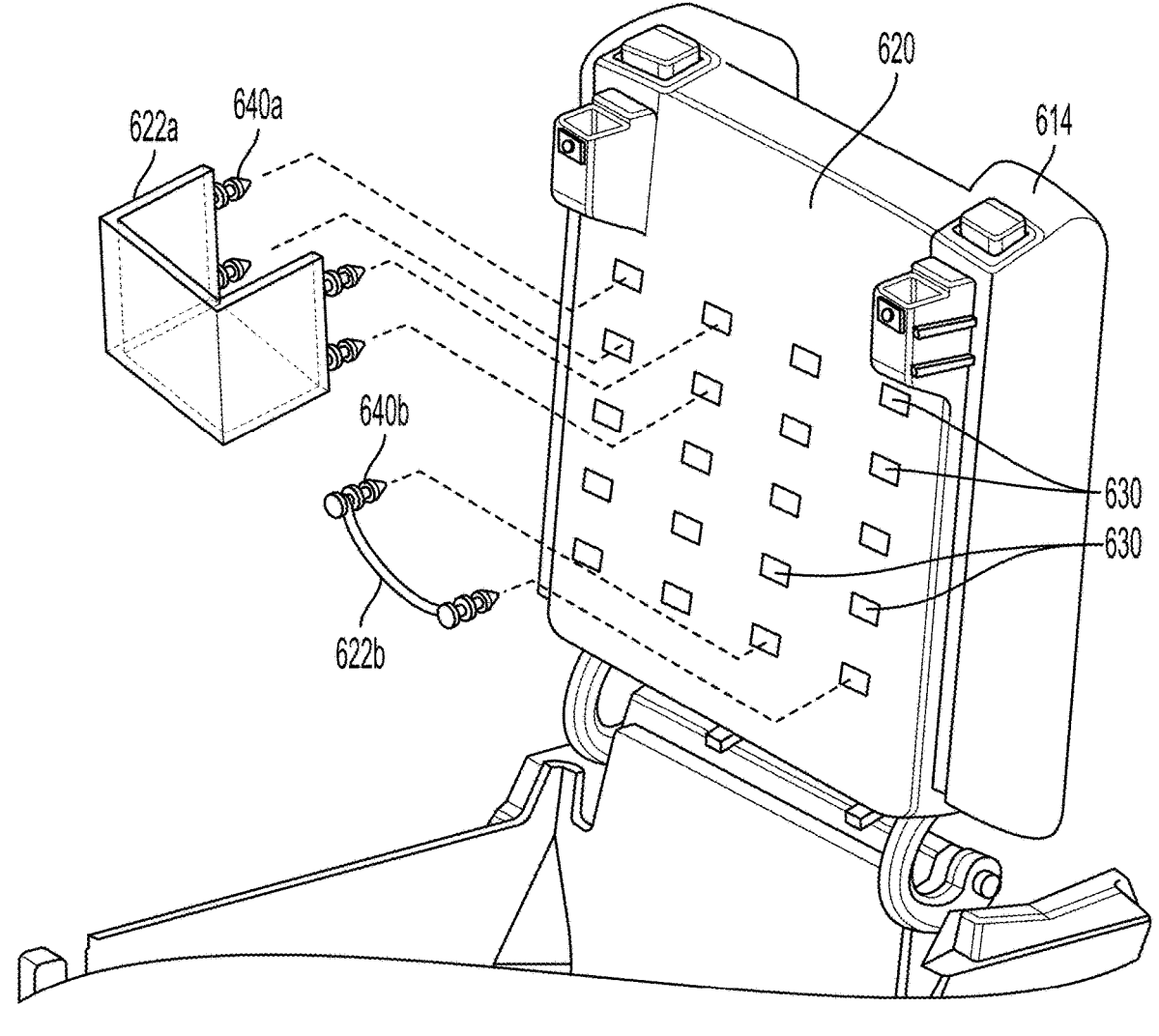
FIG. 6 is a schematic fragmentary, assembly view of a vehicle center console lid having a plurality of lid apertures and a plurality of retainers for modular center console storage according to an embodiment of the present disclosure.

With reference to FIG. 6, a lid 614 is illustrated as having a plurality of apertures 630 (also referred to herein as lid apertures) disposed in an inner surface 620 thereof. An attachment features 640a of a retainer 622a can be configured to be received by each of the apertures 630, whereby the retainer 622a is configurable between a plurality of positions with respect to the lid 614. Stated differently, the retainer 622a can be configurable between various positions as desired by a user. In this regard, the apertures 630 can be disposed in a grid-like manner (e.g., having a plurality of rows and columns). Similarly, an attachment features 640b of a retainer 622b can be configured to be received by each of the apertures 630, whereby the retainer 622b is configurable between a plurality of positions with respect to the lid 614. Stated differently, the retainer 622b can be configurable between various positions as desired by a user. In various embodiments, the retainer 622*a* includes a bin. In various embodiments, the retainer 622*b* includes a strap (e.g., a textile fabric, a cord, etc.).

Figure 7:
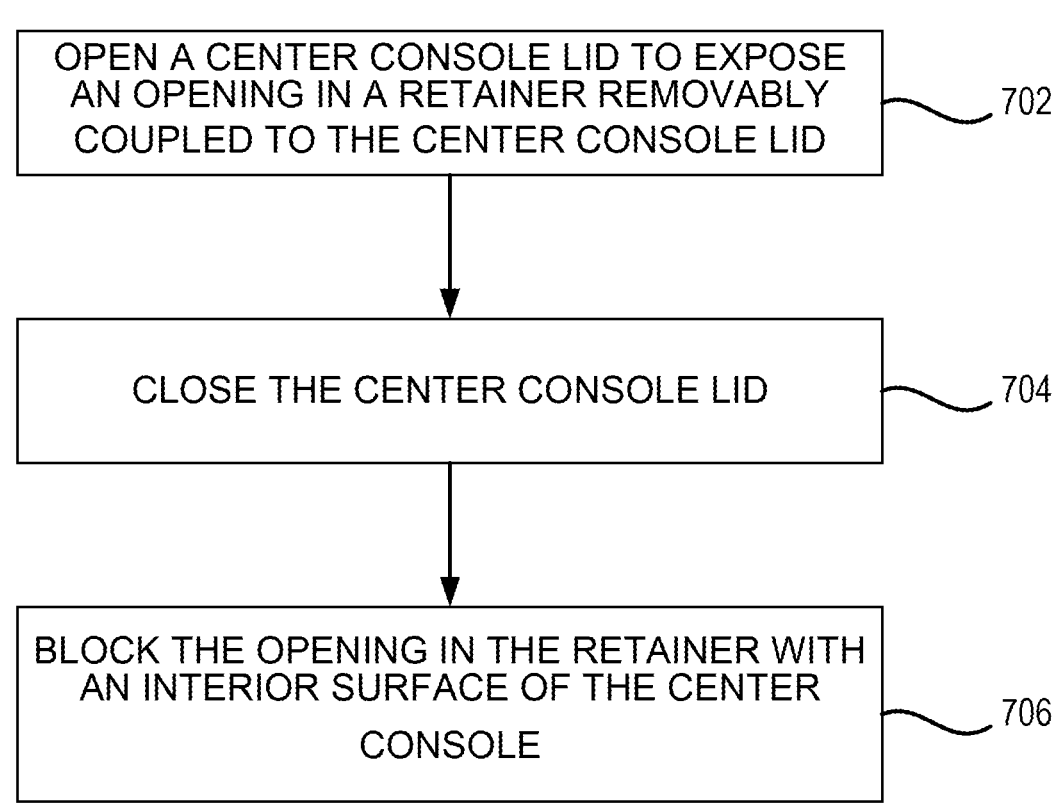
FIG. 7 is a flowchart illustrating a method for accommodating one or more items in a vehicle center console according to an embodiment of the present disclosure.

With reference to FIG. 7, a flowchart illustrating a method 700 is provided. In various embodiments, the method 700 is a method for storing one or more items in a center console compartment of a vehicle. For ease of description, the method 700 is described below with reference to FIG. 1A and FIG. 1B. The method 700 of the present disclosure, however, is not limited to use of the exemplary center console 100 of FIG. 1A and FIG. 1B.

In step 702, the method 700 includes opening a center console lid 114 to expose an opening 124 in a retainer 122 removably coupled to the center console lid 114.

In step 704, the method 700 includes closing the center console lid 114.

In step 706, the method 700 includes blocking the opening 124 in the retainer 122 with an interior surface 126 of the center console 100 to contain one or more items 125 within the retainer 122.

In various embodiments, the method 700 further includes securing the retainer 122 to the center console lid 114 with an attachment feature 240—e.g., a rubber button fastener (see FIG. 3B).

Where used throughout the specification and the claims, "at least one of A or B" includes "A" only, "B" only, or "A and B." Exemplary embodiments of the apparatuses, the systems, and the methods described herein have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. An apparatus for a vehicle, the apparatus comprising:
a compartment having an edge surrounding a cavity;
a lid pivotally coupled to the compartment, the lid including (i) an inner surface sized to span over the cavity and at least partially enclose the compartment and (ii) a plurality of lid apertures disposed in the inner surface; and
a retainer sized and configured to removably couple to the inner surface via the plurality of lid apertures, wherein each of the plurality of apertures is configured to receive an attachment feature of the retainer for securing the retainer to the lid, whereby the retainer is selectively repositionable among a plurality of locations on the lid.

2. The apparatus of claim 1, wherein the retainer is configured to be suspended from the lid when the lid is in a closed position.

3. The apparatus of claim 2, wherein the retainer at least partially defines an opening for receiving one or more items when the lid is in an open position, the one or more items being stored in the compartment when the lid is in the closed position.

4. The apparatus of claim 3, wherein an interior surface of the compartment is disposed at the opening of the retainer in response to the lid moving to the closed position, whereby the one or more items are blocked from exiting the retainer.

5. The apparatus of claim 4, further comprising a plurality of attachment features including the attachment feature, wherein each attachment feature of the plurality of attachment features includes a clamping member configured to clamp to the lid.

6. The apparatus of claim 1, wherein the attachment feature comprises a plurality of rubber button fasteners configured to attach the retainer to the lid, each rubber button fastener includes a first flange, a second flange, and a third flange, the inner surface of the lid is configured to be received between the first flange and the second flange, and an attachment portion of the retainer is configured to be received between the second flange and the third flange.

7. The apparatus of claim 1, wherein the retainer includes an elastic strap configured to bias a portion of the retainer toward the lid.

8. The apparatus of claim 1, wherein the retainer includes a first wall extending away from the inner surface of the lid, a second wall extending from the first wall toward an opening into a space between the second wall and the inner surface of the lid, a third wall located at a first side of the second wall, and a fourth wall located at a second side of the second wall, and in response to the lid moving to a closed position, the second wall of the retainer is inclined at an angle with respect to a horizontal plane.

9. The apparatus of claim 1, wherein the retainer includes a first side portion extending from the lid, a central portion extending from the first side portion, and a second side portion at least partially defining an opening whereby the retainer is configured to receive one or more items for storage, the second side portion extending toward the lid, and the retainer further includes a retainer lid disposed at the opening.

10. The apparatus of claim 1, wherein the inner surface includes a first side surface and a second side surface defining a recess in the inner surface, the retainer configured to removably couple to the first side surface and the second side surface, the retainer and the inner surface define an opening whereby one or more items can be received therebetween.

11. The apparatus of claim 1, wherein the retainer includes a first wall extending away from the inner surface of the lid, a second wall extending from the first wall toward an opening into a space between the second wall and the inner surface of the lid, a third wall located at a first side of the second wall, and a fourth wall located at a second side of the second wall, and the attachment feature extends from at least one of the third wall and the fourth wall.

12. A vehicle center console, comprising:
a compartment having an edge surrounding a cavity;
a lid pivotally coupled to the compartment, the lid including an inner surface sized to span over the cavity and at least partially enclose the compartment;
a plurality of lid apertures disposed in the inner surface; and
a retainer sized and configured to removably couple to the inner surface via the plurality of lid apertures, wherein each of the plurality of lid apertures is configured to receive an attachment feature of the retainer, whereby the retainer is selectively repositionable among a plurality of locations on the lid.

13. The vehicle center console of claim 12, wherein the attachment feature comprises a rubber button fastener configured to couple to the lid via a first lid aperture of the plurality of lid apertures, whereby the retainer is configured to removably couple to the inner surface.

14. The vehicle center console of claim 13, wherein the retainer includes a plurality of retainer apertures, the rubber button fastener configured to couple to the retainer via a first retainer aperture of the plurality of retainer apertures.

15. The vehicle center console of claim 12, wherein the attachment feature includes a clamping member configured to clamp to the lid at a first lid aperture.

16. The vehicle center console of claim 12, wherein the attachment feature is configured to be received by a first lid aperture and a second lid aperture of the plurality of lid apertures, and the first attachment feature is moveable between the first lid aperture and the second lid aperture to adjust a position of the retainer.

17. A method comprising:

removably coupling a retainer to an inner surface of a center console lid via a plurality of apertures disposed in the lid, wherein each of the plurality of lid apertures is configured to receive an attachment feature of the retainer, whereby the retainer is selectively repositionable among a plurality of locations on the lid;

opening the center console lid to expose an opening in the retainer removably coupled to the center console lid, the retainer defining a receptacle for receiving one or more items;

closing the center console lid; and blocking the opening in the retainer with an interior surface of the center console to contain the one or more items within the retainer.

18. The method of claim 17, further comprising securing the retainer to the center console lid with the attachment feature, wherein the attachment feature comprises a rubber button fastener.

\* \* \* \* \*